United States Patent [19]

Furukawa et al.

[11] 4,361,608

[45] Nov. 30, 1982

[54] RUBBER LAMINATE AND PROCESS FOR PRODUCTION THEREOF

[75] Inventors: Yasuyoshi Furukawa, Neyagawa; Shinji Yoshida, Settsu, both of Japan

[73] Assignee: Daikin Kogyo Co., Ltd., Osaka, Japan

[21] Appl. No.: 261,030

[22] Filed: May 6, 1981

Related U.S. Application Data

[63] Continuation-in-part of Ser. No. 81,896, Oct. 4, 1979, abandoned.

[30] Foreign Application Priority Data

Oct. 6, 1978 [JP] Japan ................................ 53/123901
Oct. 4, 1979 [GB] United Kingdom ................. 7934408

[51] Int. Cl.$^3$ ...................... B32B 27/00; F16L 11/04; C09J 5/02
[52] U.S. Cl. ...................................... 428/36; 428/413; 428/421; 428/422; 428/519; 428/520; 428/521; 428/522; 428/911; 156/330; 156/307.1; 156/331.1
[58] Field of Search ................. 156/331.1, 330, 307.1; 428/413, 36, 420–422, 519–522, 911, 494, 495

[56] References Cited

U.S. PATENT DOCUMENTS

| | | | |
|---|---|---|---|
| 2,809,130 | 10/1957 | Rappaport | 428/421 X |
| 2,825,661 | 3/1958 | Dosmann | 428/422 |
| 3,111,450 | 11/1963 | Stevens | 428/421 |
| 3,133,854 | 5/1964 | Simms | 428/421 |
| 3,170,811 | 2/1965 | Sands | 428/421 |
| 3,616,192 | 10/1971 | Sinclair | 428/421 X |

*Primary Examiner*—P. Ives
*Attorney, Agent, or Firm*—Birch, Stewart, Kolasch & Birch

[57] ABSTRACT

A rubber laminate comprising at least one sheet of a fluorine-containing rubber and at least one sheet of a nitrile/butadiene rubber wherein either one of the rubber sheets is incorporated by mixing with an epoxy resin and the other of the rubber sheets is incorporated by mixing with a curing agent for the resin which is produced by assembling the sheets under pressure in the presence of a curing temperature. The resulting rubber laminate has an excellent impermeability to liquids and is useful for preparing various devices or vessels for transferring or treating organic solvents and oils, e.g. a hose for gasoline.

16 Claims, No Drawings

RUBBER LAMINATE AND PROCESS FOR PRODUCTION THEREOF

This application is a Continuation-in-Part application of Ser. No. 081,896 filed on Oct. 4, 1979, now abandoned.

The present invention relates to a rubber laminate and a process for production thereof. More particularly, it relates to a novel rubber laminate comprising a sheet of a fluorine-containing rubber and a sheet of a nitrile/butadiene rubber which has an excellent impermeability to liquids, and a process for production of the same.

Nitrile-butadiene rubbers have usually an excellent oil resistance and shows excellent resistance to fats, oils and petroleums. However, the nitrile/butadiene rubbers have a comparatively large permeability to organic solvents, and the organic solvents having a low boiling point which are permeated into the rubber are undesirably volatilized in the gaseous form. For instance, a hose for transfer of gasoline is usually made of nitrile/butadiene rubber, and when such hose made of nitrile/butadiene rubber is used for the transfer of gasoline, gasoline permeates into the hose and the permeated gasoline is unfavorably volatilized into the air, which causes not only loss of gasoline but also environmental pollution around the location where the gasoline is handled.

On the other hand, fluorine-containing rubbers have an excellent solvent resistance and have also a far smaller permeability to organic solvents in comparison with nitrile/butadiene rubbers. The present inventors have experimentally confirmed that a sheet of a fluorine-containing rubber having a thickness of 0.3 mm has a permeability to gasoline of about 1/10 or lower than that of a sheet of a nitrile/butadiene rubber having a thickness of 2.5 mm. The fluorine-containing rubber also has an excellent resistance to a sour gasoline, and hence it is great as a hose material for transfer of gasoline or the like. However, fluorine-containing rubbers are very expensive and hence present a problem from an economical viewpoint.

Aiming at the extremely small permeability to organic solvents of the fluorine-containing rubbers, the present inventors have intensively studied to obtain a composite material of the conventional nitrile/butadiene rubber sheet with the fluorine-containing rubber sheet. As a result, they have succeeded in the production of a laminated product of both sheets which has an excellent impermeability to organic solvents.

An object of the present invention is to provide a rubber laminate having an excellent impermeability to liquids. Another object of the invention is to provide an improvement in the impermeability to liquids of the conventional nitrile/butadiene rubber sheet. A further object of the invention is to provide a process for producing the rubber laminate. These objects and other objects and advantages of the present invention will be apparent from the following description.

The rubber laminate of the present invention comprises at least one sheet of a fluorine-containing rubber and at least one sheet of a nitrile/butadiene rubber wherein either one of the rubbers is incorporated by mixing with an epoxy resin and the other one of them is incorporated by mixing with a curing agent for the resin, said sheets being adhered to each other by pressure curing. The components of the laminate of the invention very strongly adhere to each other without the necessity of using another layer between the sheets (e.g. a layer of an adhesive).

The rubber laminate can be prepared by assembling one or more sheets of a fluorine-containing rubber and one or more sheets of a nitrile/butadiene rubber wherein either one of the rubbers is incorporated by mixing with an epoxy resin and the other one of them is incorporated by mixing with a curing agent for the resin, and subjecting the sheets assembled in a pile to pressure curing under conventional curing conditions. When two or more sheets of each rubber are used, they are prelaminated. According to this process, both sheets can be strongly adhered to each other without any specific surface treatment of the sheets and without utilizing another layer of a specific adhesive. Alternatively, the rubbers are extruded by a conventional method to form a double layer hose and the resulting hose is subjected to curing under conventional curing conditions. The pressure curing and the curing of the extruded double layer hose may be carried out at a curing temperature of 140° to 180° C. for 20 to 60 minutes. By such a curing treatment, there can be obtained a laminate wherein the fluorine-containing rubber and the nitrile/butadiene rubber are strongly adhered together, so that the laminate can be used for a long period of time without separating into individual sheets.

The fluorine-containing rubber used in the present invention is a highly fluorinated rubber-like copolymer, for instance, a rubber-like copolymer of vinylidene fluoride and other fluoroolefins, wherein the content of vinylidene fluoride is in the range of 80 to 20% by weight based on the weight of the copolymer. Suitable examples of the other fluoroolefins are hexafluoropropene, pentafluoropropene, trifluoroethylene, trifluorochloroethylene, tetrafluoroethylene, vinyl fluoride, perfluoro(methyl vinyl ether), perfluoro(propyl vinyl ether), or the like, which may be used alone or in combination of two or more thereof. Particularly suitable examples of the fluorine-containing rubbers are a rubber-like copolymer of vinylidene fluoride/hexafluoropropene and a terpolymer of vinylidene fluoride/tetrafluoroethylene/hexafluoropropene. A copolymer of tetrafluoroethylene/propylene is also usable.

The nitrile/butadiene rubber used in the present invention includes a rubber-like copolymer of butadiene and acrylonitrile. The nitrile/butadiene rubber may have a wide range of a nitrile content from low content to extremely high content, and the content of acrylonitrile may be in the range of 15 to 50% by weight based on the total weight of the copolymer.

The epoxy resin to be incorporated into either one of the fluorine-containing rubber and the nitrile/butadiene rubber includes thermoplastic resins which have two or more epoxy groups in the molecule. Suitable epoxy resins are produced by the reaction of epichlorohydrin and a hydroxyl compound. Typical commercial epoxy resins are disclosed in the Encyclopedia of Polymer Science and Technology, Vol. 6, pages 214–215. The most suitable epoxy resin is a resin obtained by reacting bisphenol A and epichlorohydrin. The epoxy resin may be incorporated into either one of the rubbers in an amount of 1 to 20 parts by weight, preferably 1 to 10 parts by weight, per 100 parts by weight of the rubber.

The curing agent used for curing the epoxy resin includes amines, organic acids, acid anhydrides, or the like, among which amines are most suitable. Suitable examples of the amine are hexamethylenediamine carbamate, N,N'-dicinnamylidene-1,6-hexanediamine and di(p-aminocyclohexyl)methane. Suitable examples of the organic acids and acid anhydrides are phthalic acid, maleic acid, trimellitic acid, chlorendic acid, and anhydrides of these acids. The curing agent is incorporated into either one of the rubbers in an amount of 0.5 to 10 parts by weight, preferably 1 to 5 parts by weight, per 100 parts by weight of the rubber.

The fluorine-containing rubber and nitrile/butadiene rubber may also be compounded with a conventional vulcanizing agent (e.g. hexamethylenediamine carbamate, N,N'-dicinnamylidene-1,6-hexanediamine or di(p-aminocyclohexyl)methane used for the fluorine-containing rubber, and sulfur used for the nitrile/butadiene rubber) and a vulcanization accelerator (e.g. tetramethyl thiuram disulfide or N-cyclohexyl-2-benzothiazolylsulfinamide used for the nitrile/butadiene rubber).

The rubber laminate of fluorine-containing rubber and nitrile/butadiene rubber of the present invention can be used as a hose for the transfer of gasoline and is also useful for preparing various devices or vessels for treating organic solvents and oils, for example, a bracket for a printing roll. When the devices made of the laminate of the present invention are used in utilities wherein organic solvents or oils contact the devices, no volatilization of organic solvent is observed.

The present invention is illustrated by the following Examples but is not limited thereto. In the Examples, parts are by weight.

EXAMPLE 1

| Components of fluorine-contained rubber composition: | |
|---|---|
| Vinylidene fluoride/tetrafluoro-ethylene/hexafluoropropene terpolymer | 100 parts |
| Magnesium oxide | 15 parts |
| Medium Thermal Carbon | 20 parts |
| N,N'—Dicinnamylidene-1,6-hexanediamine | 3 parts |
| Components of nitrile/butadiene rubber composition: | |
| Nitrile/butadiene rubber (medium nitrile content) | 100 parts |
| Sulfur powder | 0.2 parts |
| Vulcanization accelerator TT (a tradename of tetramethyl thiuram disulfide) | 2 parts |
| Vulcanization accelerator CZ (a tradename of N—cyclohexyl-2-benzothiazolyl-sulfinamide) | 1 parts |
| Zinc oxide | 5 parts |
| Epoxy resin (EPICOAT 828 ®, made by Shell Chemical Co.) | 1 parts |

The above two compositions were each mixed uniformly with a rubber roll and the resulting mixtures were each formed into a sheet, and the resulting sheets were assembled to and subjected to press curing at 155° C. for 30 minutes to give a laminate.

The laminate thus obtained was cut in the form of a strip having a width of 2.5 cm and was drawn with an autograph at a speed of 50 mm/minute in order to test the adhesion thereof. As a result, it showed an adhesion of 1.8 kg/cm.

EXAMPLE 2

By using the same compositions as disclosed in Example 1 except that the amount of epoxy resin in the nitrile/butadiene rubber composition was changed to 3 parts, a laminate was prepared likewise. As a result of adhesion test of the laminate thus obtained, it showed an adhesion of 2.0 kg/cm.

EXAMPLE 3

By using the same compositions as disclosed in Example 1 except that the amount of epoxy resin in the nitrile/butadiene rubber composition was changed to 5 parts, a laminate was prepared likewise. As a result of adhesion test of the laminate thus obtained, it showed an adhesion of 2.5 kg/cm.

EXAMPLE 4

By using the same compositions as disclosed in Example 1 except that the amount of epoxy resin in the nitrile/butadiene rubber composition was changed to 10 parts, a laminate was prepared likewise. As a result of adhesion test of the laminate thus obtained, it showed an adhesion of 2.4 kg/cm.

EXAMPLE 5

| Components of fluorine-contained rubber composition: | |
|---|---|
| Vinylidene fluoride/hexafluoropropene copolymer | 100 parts |
| Magnesium oxide | 3 parts |
| Medium Thermal Carbon | 20 parts |
| Calcium hydroxide | 6 parts |
| Epoxy resin (EPICOAT 828 ®, made by Shell Chemical Co.) | 1 parts |
| Components of nitrile/butadiene rubber composition: | |
| Nitrile/butadiene rubber (medium nitrile content) | 100 parts |
| Sulfur powder | 0.2 parts |
| Vulcanization accelerator TT (a tradename of tetramethyl thiuram disulfide) | 2 parts |
| Vulcanization accelerator CZ (a tradename of N-cyclohexyl-2-benzothiazolyl-sulfinamide) | 1 parts |
| Medium Thermal Carbon | 30 parts |
| Zinc oxide | 5 parts |
| N,N'-Dicinnamylidene-1,6-hexanediamine | 3 parts |

The above two compositions were each mixed uniformly with a rubber roll and the resulting mixtures were each formed into a sheet, and the resulting sheets were assembled and subjected to press curing at 155° C. for 30 minutes to give a laminate. As a result of adhesion test of the laminate thus obtained in the same manner as described in Example 1, it showed an adhesion of 1.8 kg/cm.

EXAMPLE 6

By using the same compositions as disclosed in Example 5 except that the amount of epoxy resin in the nitrile/butadiene rubber composition was changed to 3 parts, a laminate was prepared likewise. As a result of adhesion test of the laminate thus obtained, it showed an adhesion of 1.6 kg/cm.

EXAMPLE 7

By using the same compositions as disclosed in Example 5 except that the amount of epoxy resin in the nitrile/butadiene rubber composition was changed to 5 parts, a laminate was prepared likewise. As a result of adhesion test of the laminate thus obtained, it showed an adhesion of 2.0 kg/cm.

EXAMPLE 8

By using the same compositions as disclosed in Example 5 except that the amount of epoxy resin in the nitrile/butadiene rubber composition was changed to 10 parts, a laminate was prepared likewise. As a result of adhesion test of the laminate thus obtained, it showed an adhesion of 2.3 kg/cm.

REFERENCE EXAMPLE 1

The same compositions as disclosed in Example 1 except that the nitrile/butadiene rubber composition contained no epoxy resin were treated in the same manner as described in Example 1. As a result, both sheets did not adhered.

EXAMPLE 9

By using the same compositions as disclosed in Example 5 except that an amine curing agent (Pelcure HQ-1W, a tradename of polyamideamine made by Nippon Pelnox, Co.) (2 parts) was used instead of N,N'-dicinnamylidene-1,6-hexanediamine, a laminate was prepared likewise. As a result of adhesion test of the laminate thus obtained, it showed an adhesion of 2.2 kg/cm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hose possessing excellent impermeability to liquids which comprises a rubber laminate consisting essentially of at least one sheet of a fluorine-containing rubber and at least one sheet of a nitrile/butadiene rubber wherein either one of said rubber sheets is incorporated with an epoxy resin and the other one of said rubber sheets is incorporated with a curing agent for said resin, said sheets being directly adhered to each other in a cured state.

2. A rubber laminate which comprises at least one sheet of a fluorine-containing rubber and at least one sheet of a nitrile/butadiene rubber wherein either one of said rubber sheets is incorporated, by mixing, with an epoxy resin and the other of said sheets is incorporated, by mixing, with a curing agent for said resin, said sheets being directly adhered to each other in a cured state.

3. A rubber laminate according to claim 2, wherein said epoxy resin is present in an amount of 1 to 20 parts by weight per 100 parts by weight of either one of said fluorine-containing rubber and said nitrile/butadiene rubber.

4. A rubber laminate according to claim 3, wherein said curing agent is present in an amount of 0.5 to 10 parts by weight per 100 parts by weight of the other one of said fluorinated rubber and said nitrile/butadiene rubber.

5. A rubber laminate according to any one of claims 2, 3 or 4, wherein said curing agent for said epoxy resin is a member selected from the group consisting of hexamethylenediamine carbamate, N,N'-dicinnamylidene-1,6-hexanediamine, di(p-aminocyclohexyl)methane, and a mixture thereof.

6. A rubber laminate according to any one of claims 2, 3 or 4, wherein said fluorine-containing rubber is a copolymer of vinylidene fluoride and at least one other fluoroolefin selected from the group consisting of hexafluoropropene, pentafluoropropene, trifluoroethylene, trifluorochloroethylene, tetrafluoroethylene, vinyl fluoride, perfluoro(methyl vinyl ether), and perfluoro(propyl vinyl ether).

7. The rubber laminate according to claim 6, wherein the content of vinylidene fluoride is in the range of 80 to 20% by weight based on the weight of the copolymer.

8. The rubber laminate according to claim 2, wherein the nitrile of the nitrile/butadiene rubber copolymer is acrylonitrile which is present in an amount of 15 to 50% by weight, based on the total weight of the copolymer.

9. A process for producing a rubber laminate, which comprises providing a sheet of fluorine-containing rubber and a sheet of nitrile/butadiene rubber, one of said sheets having mixed therein an epoxy resin and the other of said sheets having mixed therein a curing agent for said epoxy resin, assembling said sheets so as to form a laminate arrangement and applying pressure to said rubber laminate arrangement in the presence of a curing temperature so as to produce said rubber laminate.

10. A process for producing a rubber laminate according to claim 9, wherein said epoxy resin is present in an amount of 1 to 20 parts by weight per 100 parts by weight of either one of said fluorine-containing rubber and said nitrile/butadiene rubber.

11. A process for producing a rubber laminate according to claim 10, wherein said curing agent is present in an amount of 0.5 to 10 parts by weight per 100 parts by weight of the other one of said fluorine-containing rubber and said nitrile/butadiene rubber.

12. A process for producing a rubber laminate according to anyone of claim 9, 10 or 11, wherein said curing agent for said epoxy resin is a member selected from the group consisting of hexamethylenediamine carbamate, N,N'-dicinnamylidene-1,6-hexanediamine, di(p-aminocyclohexyl)methane, and a mixture thereof.

13. A process for producing a rubber laminate according to anyone of claim 9, 10 or 11 wherein said fluorine-containing rubber is a copolymer of vinylidene fluoride and at least one other fluoroolefin selected from the group consisting of hexafluoropropene, pentafluoropropene, trifluoroethylene, trifluorochloroethylene, tetrafluoroethylene, vinyl fluoride, perfluoro(methyl vinyl ether), and perfluoro(propyl vinyl ether).

14. The process according to claim 13, wherein the content of vinylidene fluoride is in the range of 80 to 20% by weight based on the weight of the copolymer.

15. A process for producing a rubber laminate according to anyone of claim 9, 10 or 11 wherein said curing is carried out at a curing temperature of 140° to 180° C.

16. The process according to claim 9, wherein the nitrile of the nitrile/butadiene rubber copolymer is acrylonitrile which is present in an amount of 15 to 50% by weight, based on the total weight of the copolymer.

* * * * *

UNITED STATES PATENT AND TRADEMARK OFFICE
CERTIFICATE OF CORRECTION

PATENT NO. : 4,361,608
DATED : November 30, 1982
INVENTOR(S) : Yasuyoshi FURUKAWA et al It is certified that error appears in the above-identified patent and that said Letters Patent is hereby corrected as shown below:

IN THE HEADING OF THE PATENT:

In Section [30], delete:

--Oct. 4, 1979 [GB] United Kingdom..........7934408--

Signed and Sealed this

Twenty-fourth Day of September 1985

[SEAL]

Attest:

DONALD J. QUIGG

Attesting Officer

Commissioner of Patents and Trademarks—Designate